July 23, 1935.  R. FENNEMA  2,009,358

COCK

Filed March 24, 1934  2 Sheets-Sheet 1

Witness:
R. B. Davison.

Inventor:
Richard Fennema.
By Joseph O. Lange
Atty.

Patented July 23, 1935

2,009,358

UNITED STATES PATENT OFFICE 2,009,358

COCK

Richard Fennema, Chicago, Ill., assignor to Crane Co., Chicago, Ill., a corporation of Illinois Application March 24, 1934, Serial No. 717,134

3 Claims. (Cl. 251—97)

This invention relates to valves, and more particularly to a type of fluid control device, as a plug valve or cock, capable of use on pressure or flow lines where ease of cleansability and quick, positive operation is extremely essential.

It is well known, for example, that in the handling of food products, either in liquid or semisolid form, that steps for prevention of contamination of such products must be taken by the elimination of constructions interfering with the free flow thereof, avoidance of impingements against such obstructions, however small they might be, and at the same time to be positive as a closure device.

Therefore, in addition to providing for a valve which must necessarily be readily assembled and disassembled, I have in mind by means of this invention to provide a pressure flow device in which there will be a relatively unbroken flow. At the same time, when it becomes necessary to clean the article this can be done rapidly and conveniently without disturbance of fundamental working parts and their original setting as established during the course of manufacture.

Heretofore devices of this character have been difficult or inconvenient to disassemble for purpose of cleansing so that in many instances there has been a neglect of this very essential duty, and as a result there have been frequent cases of foods being spoiled because of the resultant contamination induced by neglect.

It is obvious that in such services as above mentioned the use of a lubricant on the seat surfaces between the plug and casing is objectionable; in fact, this is true wherever there might be even a possibility of line fluids contacting with the lubricant. Thus rotation of the plug is difficult unless the latter can be slightly lifted from its seat.

Therefore, an unseating feature is used, such as is illustrated in U. S. Patent No. 1,885,202, granted November 1, 1932, which feature is applied in such manner that the plug can be readily removed without disturbing the adjustment of the unseating feature.

An important object of this device is to provide for a construction in which the plug or closure member is resiliently held to its seat by accurate adjustment and at the same time forms a leakproof seal on the bearing surface therein.

Another important object is to provide a construction which is easily and quickly cleansable and equally readily assembled.

Another important object is to provide for a construction in which the adjustability of the seat bearing is easily made without being disturbed by the disassembling of the plug from the body or casing.

Another important object is to provide for a means of positively unseating the plug to render it easily operable immediately at the beginning of each turning movement, that is, whether proceeding from an open position to a closed position, or vice versa.

It will be apparent that there are a number of other advantages obtained in this construction, which will be more clearly shown upon referring to the drawings and the following description, in which Fig. 1 is a sectional assembly view of a preferred embodiment of my invention taken on the vertical centerline of the valve.

Figure 1:
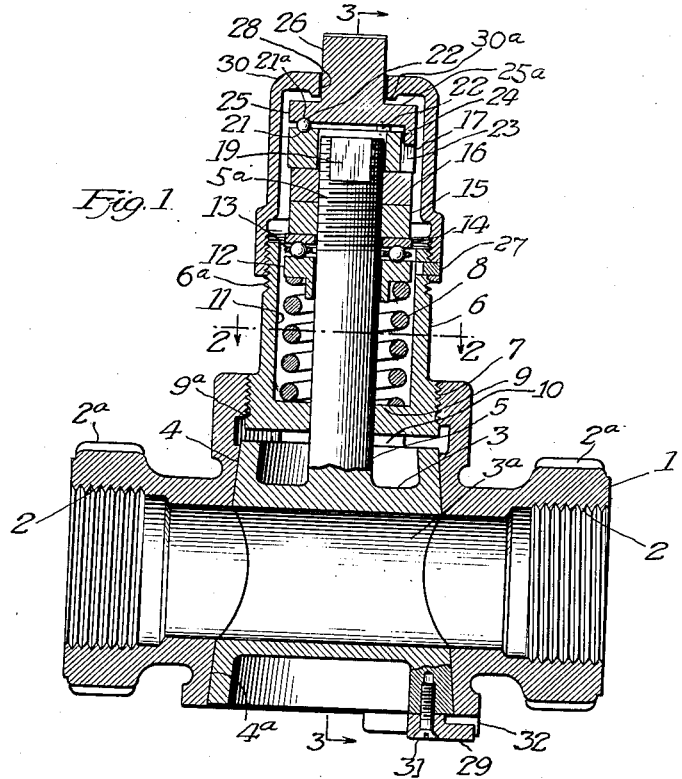
Figure 2:
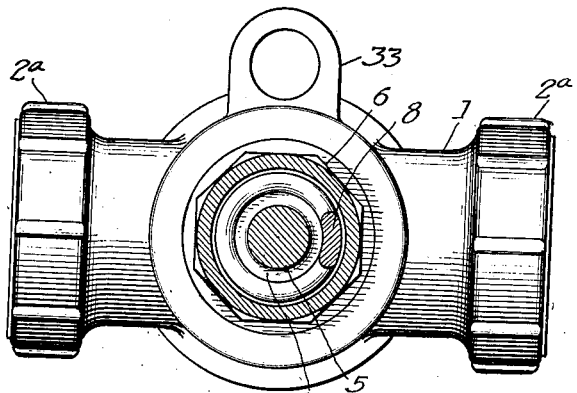
Fig. 2 is a top view in partial section taken on the line 2—2 of Fig. 1.
Figure 3:
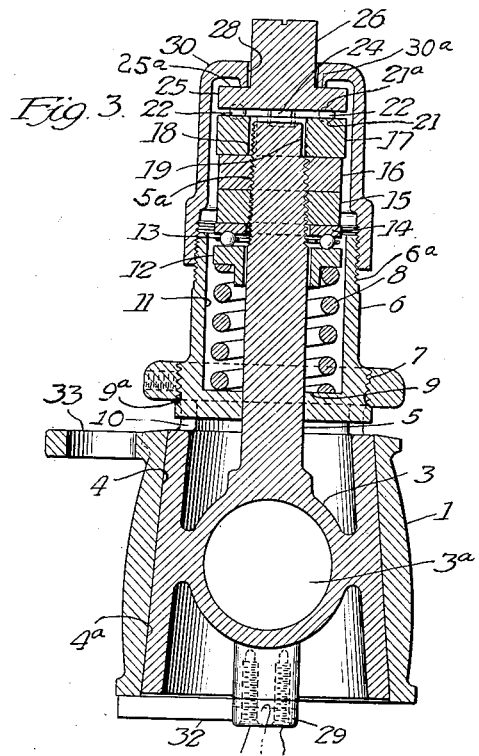
Fig. 3 is a vertical sectional view taken on the line 3—3 of Fig. 1.
Figure 4:
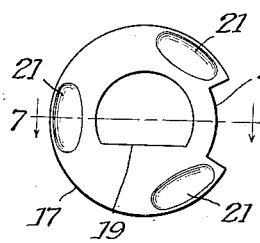
Fig. 4 is a view showing one of the lock washers arranged with an inclined ball and race arrangement accomplishing the unseating of the plug by means of a plurality of ball bearings operating in an inclined plane or groove.
Figure 5:
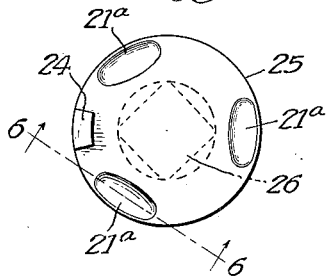
Fig. 5 is a plan view of the lower complementary washer similarly arranged to provide for the unseating of the plug.
Figure 6:
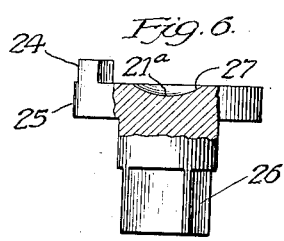
Fig. 6 is a sectional view taken on the line 6—6 of Fig. 5.
Figure 7:
Fig. 7 is a sectional view taken on the line 7—7 of Fig. 4.

Referring to Fig. 1, there is provided the usual body or casing 1, ordinarily threaded at both ends as at 2, or otherwise provided to receive a pipe or tubing for attachment to a pipe line or by gripping lugs 2a. Journalled within said casing is a tapered plug 2, made preferably with a roundway opening 3a, to form an unbroken bearing top and bottom as at 4 and 4a. Extending upwardly from the plug and preferably concentric therewith is a stem 5 extending through a centerpiece 6, which is threadedly attached to the body 1 as at 7, pulling up to a shoulder 9a, but may obviously be attached by other means equally satisfactory if desired. The centerpiece 6 also serves as a housing for a coiled spring of yielding member 8, which is preferably loosely coiled around the stem 5 resting at its lower end against the shoulder 9, contained within the hollow portion 11 of the centerpiece 6. Loosely journalled about the stem and resting upon the top of the spring 8 is a spring washer 12, upon which rests a conventional thrust bearing 13 supporting a flat washer 14. Upon the latter rests the flat ring shaped spacer washers 15 and 16, which are threadedly attached to the upper end or shank of the stem 5 and serving to hold the spring 8 compressed against the shoulder 9 of the centerpiece 6, thus drawing the plug to its seat. The upper washer 16 serves to lock the lower washer 15 upon the stem threads 5a. The load thus created is taken by the thrust bearing 13. Supported loosely upon the uppermost flat threaded washer 16 is a similar cylindrical shaped washer 17, which is locked against rotation by means of the flattened side of the stem as shown more clearly at 18 in Fig. 3, and at 19 in Fig. 4. The washer 17 on its uppermost face is fitted with a plurality of hollowed inclined races 21 as shown in Fig. 4, which are màde to receive ball bearings 22 as shown in Fig. 1. The washer 17 is preferably arcuately slotted for a portion of its periphery to provide a slot 23, which engages a complementary lug 24 of the washer 25 shown more clearly in Figs. 5 and 6 to limit rotation of the plug. The washer 25 is also provided with ball races 21a which are complementary to similarly formed races 21 of the lower washer 17. As the washer 25 is turned by a wrench (not shown) engaging the square 26, the downwardly extending lug 24 moves within the peripheral slot 23. This initial rotative movement of the upper washer is relative to the lower washer 17, which remains non-rotatable until the lug 24 strikes the end extremities of the slot 23, (depending upon the direction of rotation). This provision causes the ball in each of the races 21 to be moved along the incline 27 of the race 21, and in so doing, the space between the washers 25 and 17 is increased and forces the latter washer downward, bearing against the top of the washers 15 and 16, thus causing the plug to be displaced axially against the tension of the spring 8. The cap 30 is provided with an opening 28 through which the square 26 of the upper washer 25 projects. In the first opening operation the upper washer 25 rises until its upper face 25a abuts against the lower surface 30a of the cap 30. Thus the cap 30 prevents the washer 25 from rising any higher and the balls moving within the races 21 and 21a upon the incline 27 thus force the temporarily non-rotating washer 17 downward bearing likewise against the threaded washers fixedly attached to the stem 5, and causing axial movement of the latter. The cap 30 is locked against rotation of the pin 27.

It is thus apparent that the axial movement of the plug is capable of very fine adjustment by either of two methods used or both. The washers 15 and 16 may be definitely positioned on the stem threads so that it may require less movement of the balls in the race before axial movement of stem commences, by lessening the clearance between the surfaces 25a and 30a of the upper washer and cap, respectively. The principal use, however, of the washers 15 and 16 is to regulate the tension of the spring 8, in order to ensure a nice adjustment.

It is also evident that the spacing referred to between surfaces 25a and 30a is adjustable by careful and precise positioning of the cap 30 by means of the threads 6a, being raised or lowered by rotation thereon, after which determination, the cap 30 is locked in place by the pin 27.

It is, therefore, clear that the amount of displacement of the plug depends upon the point at which the balls in the races 21 and 21a reach within the incline 27, and this is important so that during the unseating and rotation of the plug its displacement is held to a minimum. At the same time, however, the unseating or displacement of the plug takes place before the plug can be rotated, thus preventing the scoring of the seating surfaces.

It is also provided that both ends of the plug bearing are open to atmosphere so that any leakage occurring during rotation and/or displacement flows away, and does not accumulate to contaminate the product flowing through the line. At the upper end of the casing, the ports 10, preferably diametrically disposed, assist in providing for such elimination.

A very important advantage of the entire assembly lies in the simple and convenient manner in which the unseating mechanism consisting of the centerpiece, cap, spring and washers, is removable as a sealed or locked unit, by the simple expedient of turning the centerpiece 6 on its threads 7, thus breaking the joint at the shoulder 9a. The threaded opening 9 is made sufficiently large so that the complete assembled unit is passed through this opening and removed through the larger end of the tapered bearing 4a. It is well appreciated by the trade as to the advantages flowing from such construction in being able to clean and inspect the plug or the casing without disturbing the original setting as established by the manufacturer, especially considering proper services as to temperatures, pressures, fluid viscosities, and other special items provided for during course of manufacture.

The rotation of the plug is limited preferably to a quarter turn by the stop 29 attached to the plug 3 at its lower end by means of the machine screw 31 and the complementary lug 32 affixed to the casing.

Means may also be provided for locking the valve against tampering, or operation by unauthorized persons by a locking lug 33 preferably made integral with the casing 1, and capable of having a superposed hood (not shown) slipped over the entire upper assembly, a padlock (not shown) uniting and locking the hood to the lug. In the handling of food products and other liquids valuable by measure, such precaution is generally very necessary.

It is obvious that my invention is capable of numerous modifications and applications. I, therefore, desire to be limited only to the extent of the appended claims:

1. In a valve, a casing having a passage therethrough, a tapered seat interposed in said passage, a valve closure member removably mounted to rotate upon said seat, said closure member being provided with an extension thereof providing rotating means therefor, said extension having in combination therewith means for unseating said closure member, said unseating occurring before rotation of said closure member is effected yielding means for normally holding said closure member against said seat, an annular enclosure separate from said casing for containing said yielding means, a superposed enclosure for said unseating means, the latter providing for adjustability of said unseating means, both enclosures together with the yielding and unseating means being simultaneously removable with the valve closure member when the latter is removed axially from its seat within the casing.

2. In a valve, a casing having a passage therethrough, a tapered seat interposed in said passage, a valve closure member removably mounted to rotate upon said seat, said closure member being provided with an extension thereof providing rotating means therefor, said extension having in combination therewith means for unseating said closure member, said unseating occurring before rotation of said closure member is effected, a yielding member for normally holding said closure member upon said seat, a housing separate from said casing for said yielding means, a superposed enclosure for said unseating means, the latter providing for adjustability of said unseating means, and being detachably mounted upon the housing for the said yielding means, both the said housing and the said enclosure together with the yielding and unseating means being simultaneously removable with the valve closure member when the latter is removed axially from its seat within the casing.

3. In a valve, a casing having a passage therethrough, a tapered seat interposed in said passage, a valve closure member removably mounted to rotate upon said seat, a yielding member holding said closure member normally against said seat, said closure member being provided with an extension thereof providing rotating means therefor and also having means for unseating said closure member, a housing for said unseating and yielding means removably mounted upon said casing at the smaller end of the tapered seat, said yielding means being mounted upon said extension and interposed between said housing and said rotating means, said enclosure being integrally removable with said closure member when the latter is removed axially from the larger end of its tapered seat within the casing.

RICHARD FENNEMA.